(12) United States Patent
Li et al.

(10) Patent No.: US 8,189,963 B2
(45) Date of Patent: May 29, 2012

(54) MATCHING ADVERTISEMENTS TO VISUAL MEDIA OBJECTS

(75) Inventors: Li Li, Issaquah, WA (US); Brian Burdick, Bellevue, WA (US); Sachin Dhawan, Redmond, WA (US); Ewa Dominowska, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 974 days.

(21) Appl. No.: 11/939,269

(22) Filed: Nov. 13, 2007

(65) Prior Publication Data

US 2009/0123090 A1    May 14, 2009

(51) Int. Cl.
*G06K 9/00* (2006.01)
*G06K 9/54* (2006.01)
*G06K 9/60* (2006.01)
*H04N 1/00* (2006.01)
*G06F 7/00* (2006.01)
*G06F 17/30* (2006.01)

(52) U.S. Cl. ........ 382/305; 382/181; 382/100; 358/403; 707/748; 707/749; 707/750; 707/751; 707/752; 707/738; 707/729

(58) Field of Classification Search .......... None
See application file for complete search history.

(56) References Cited

U.S. PATENT DOCUMENTS

| | | | |
|---|---|---|---|
| 5,442,778 A * | 8/1995 | Pedersen et al. ............ 1/1 |
| 6,195,659 B1 * | 2/2001 | Hyatt ..................... 1/1 |
| 6,647,131 B1 * | 11/2003 | Bradski ................ 382/107 |
| 6,879,702 B1 * | 4/2005 | Fisher et al. ............ 382/100 |
| 7,133,571 B2 * | 11/2006 | Cheatle ................ 382/282 |
| 7,457,467 B2 * | 11/2008 | Dance et al. ............ 382/224 |
| 7,542,610 B2 * | 6/2009 | Gokturk et al. .......... 382/209 |
| 8,036,421 B2 * | 10/2011 | Davis et al. ............ 382/100 |
| 8,060,506 B1 * | 11/2011 | Chang et al. ............ 707/729 |
| 8,065,611 B1 * | 11/2011 | Chan et al. ............. 715/253 |
| 2004/0073921 A1 * | 4/2004 | Neely et al. ............ 725/45 |
| 2004/0181554 A1 * | 9/2004 | Heckerman et al. ....... 707/104.1 |
| 2004/0267725 A1 | 12/2004 | Harik |
| 2005/0149395 A1 | 7/2005 | Henkin et al. |
| 2006/0179453 A1 | 8/2006 | Kadie et al. |
| 2006/0212350 A1 | 9/2006 | Ellis et al. |
| 2006/0294571 A1 | 12/2006 | Moore et al. |
| 2007/0073756 A1 | 3/2007 | Manhas et al. |
| 2007/0083611 A1 | 4/2007 | Farago et al. |
| 2007/0100801 A1 | 5/2007 | Celik et al. |
| 2007/0112630 A1 | 5/2007 | Lau et al. |
| 2007/0250487 A1 * | 10/2007 | Reuther ................ 707/3 |
| 2007/0255755 A1 * | 11/2007 | Zhang et al. ............ 707/104.1 |

(Continued)

OTHER PUBLICATIONS

Jennifer Slegg, "How Google Should Monetize YouTube With AdWords & AdSense," Making Sense of Contextual Advertising,—JenSense.com, pp. 1-6, Oct. 11, 2006, http://www.jensense.com/archives/2006/10/how_google_shou.html.

(Continued)

*Primary Examiner* — Michelle Entezari
(74) *Attorney, Agent, or Firm* — Shook, Hardy & Bacon L.L.P.

(57) ABSTRACT

Systems, methods, and computer-readable media for matching a visual media object to an advertisement are provided. Embodiments of the present invention include receiving uncategorized visual media objects, automatically categorizing received visual media objects into subject-matter categories using image recognition technology, and retrieving advertisements assigned to the same subject-matter category for presentation in association therewith.

15 Claims, 3 Drawing Sheets

U.S. PATENT DOCUMENTS

2008/0306749 A1* 12/2008 Fredlund et al. .................. 705/1
2009/0037263 A1* 2/2009 Patil ................................ 705/14
2009/0076899 A1* 3/2009 Gbodimowo .................. 705/14

OTHER PUBLICATIONS

Anthony Hoogs, Jens Rittscher, Gees Stein, and John Schmiederer, "Video Content Annotation Using Visual Analysis and a Large Semantic Knowledgebase," 8 pages, 2003 IEEE Computer Society Conference on Computer Vision and Pattern Recognition (CVPR'03); http://ieeexplore.ieee.org/xpl/freeabs_all.jsp?arnumber=1211487.

Kristen Grauman and Trevor Darrell, Unsupervised Learning of Categories from Sets of Partially Matching Image Features, 7 pages, Jun. 2006, Proceedings of the IEEE Conference on Computer Vision and Pattern Recognition (CVPR), New York City, NY.

Alexander C. Berg, Tamara L. Berg, and Jitendra Malik, Shape Matching and Object Recognition using Low Distortion Correspondences, 8 pages, Jun. 2005, Proceedings of the IEEE Conference on Computer Vision and Pattern Recognition, San Diego, CA.

* cited by examiner

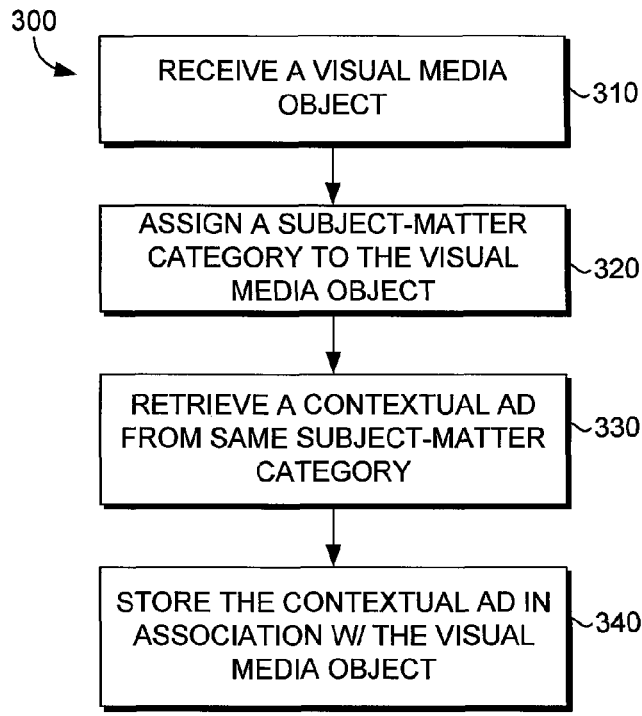
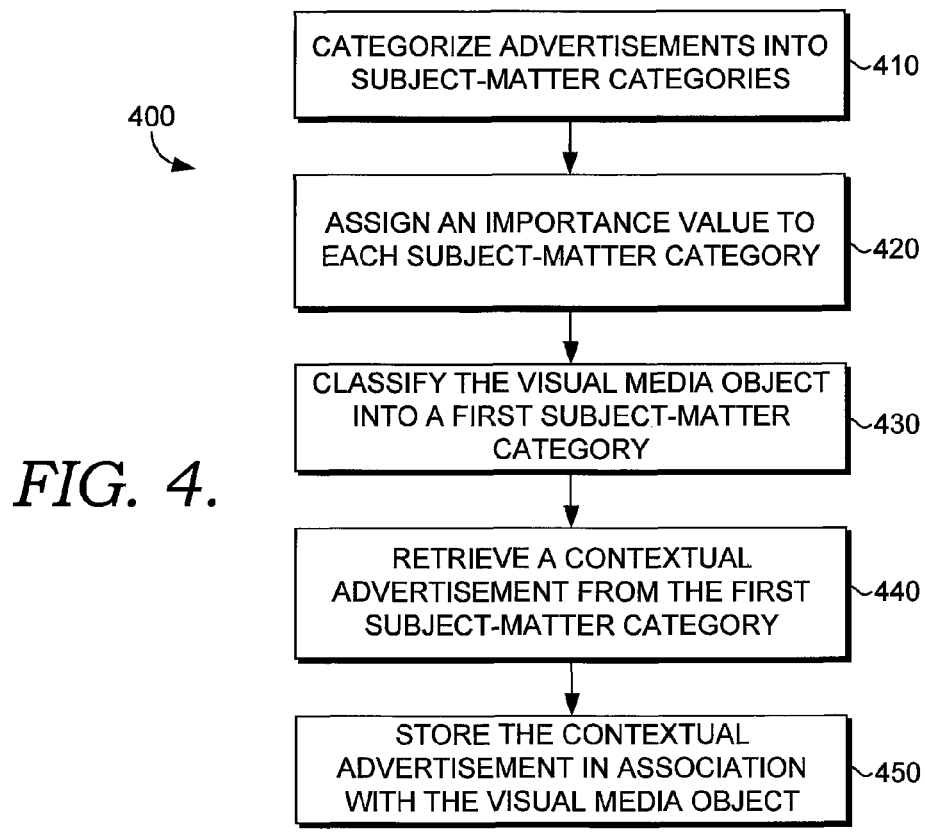

MATCHING ADVERTISEMENTS TO VISUAL MEDIA OBJECTS

BACKGROUND

On the Internet, advertisements are often presented that are based on the content displayed on a webpage. The goal is to match the subject matter of the advertisement with the subject matter of the webpage's content. The subject matter of the advertisement is often determined based upon keywords that are submitted with and/or extracted from the textual content of the advertisement. The subject matter of a webpage's content is often automatically determined by a computer program that evaluates words and/or phrases within the textual content of the webpage. The subject matter of a visual media object, such as an image or a video, may not be automatically determined as readily, because the visual media object often lacks textual content. This makes it difficult to automatically match the subject matter of a visual media object with the subject matter of an advertisement.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to matching advertisements with visual media objects, e.g., digital photographs and videos. An advertisement is selected to be associated with a visual media object by matching the subject matter of the advertisement with the subject matter of the visual media object at the same level of specificity. In general, advertisements are submitted with detailed keywords that may be used to define a very specific subject matter. On the other hand, image recognition technologies utilized to determine the subject matter of visual media objects may only be capable of placing visual media objects into more general subject-matter categories. Thus, in accordance with embodiments of the present invention, advertisements may be grouped into categories that correlate with the categories utilized by the relevant image recognition technology. In this way, visual media objects may be received and assigned a subject matter. An advertisement, having been assigned the same subject matter as the visual media object, may then be matched with the visual media object and the two may be presented together, if desired.

BRIEF DESCRIPTION OF THE DRAWINGS

The present invention is described in detail below with reference to the attached drawing figures, wherein:

FIG. 3 is a flow diagram illustrating an exemplary method for selecting an advertisement to be associated with a visual media object, in accordance with an embodiment of the present invention; and FIG. 4 is flow diagram illustrating an exemplary method for selecting an advertisement having the same context as a visual media object, in accordance with an embodiment of the present invention.

DETAILED DESCRIPTION

Figure 1:
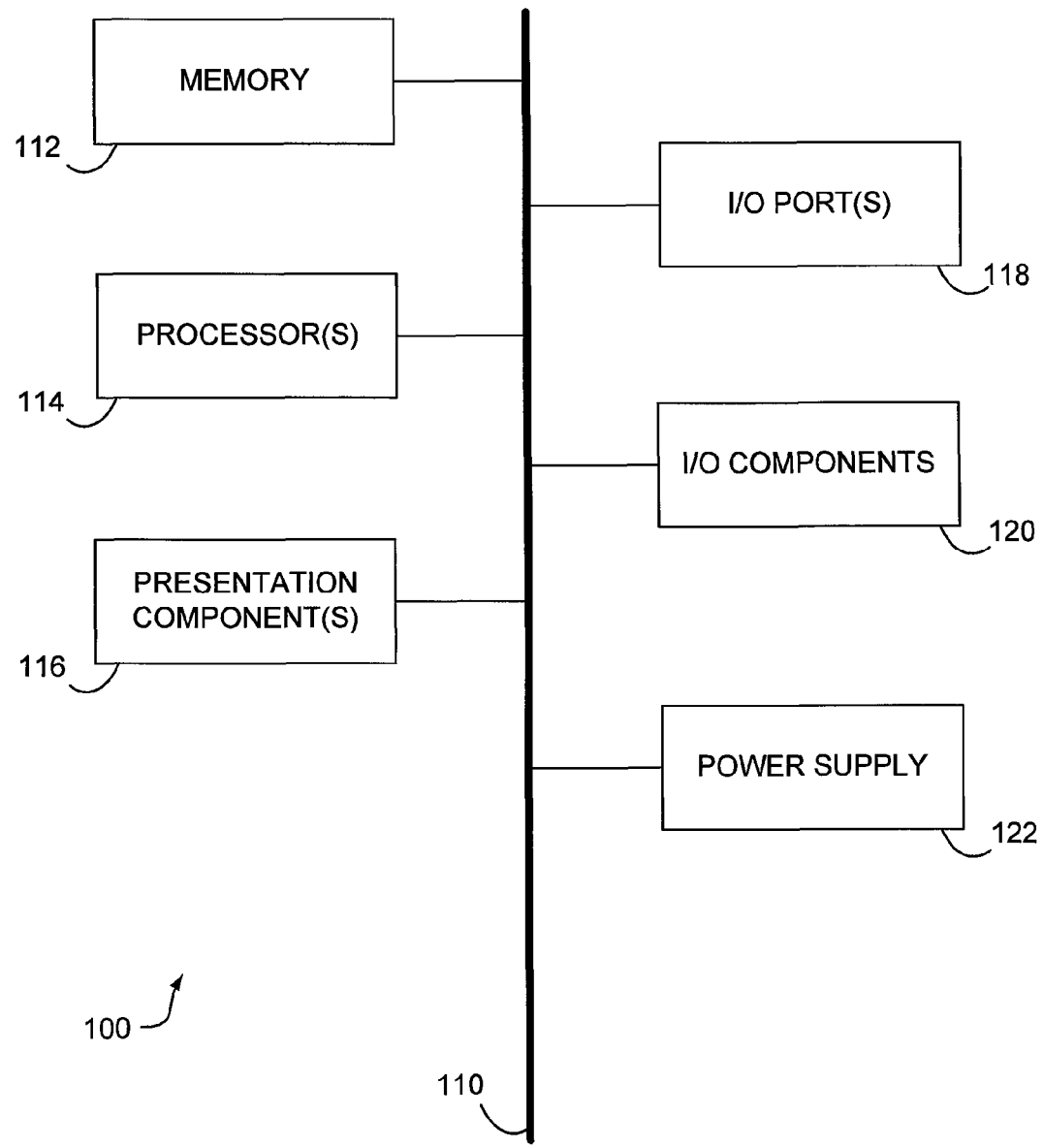
FIG. 1 is a block diagram of an exemplary computing environment for selecting an advertisement to be associated with a visual media object that is suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Accordingly, in one embodiment, the present invention relates to computer storage media having computer-executable instructions embodied thereon for performing a method of selecting advertisements to be associated with visual media objects. The method includes receiving a visual media object and assigning a subject-matter category to the visual media object using automated image recognition. The method also includes, retrieving an advertisement that is assigned the same subject-matter category as the visual media object to be associated with the visual media object. The method further includes, storing the advertisement in association with the visual media object.

In another embodiment, the present invention relates to a computerized method for selecting advertisements having the same context as visual media objects. The method includes categorizing one or more advertisements into a set of subject-matter categories, and assigning an importance value to each subject-matter category. The method further includes, classifying one or more of the visual media objects into a first subject-matter category that has an importance value of at least a threshold value, retrieving a categorized advertisement from the first subject-matter category, and storing the categorized advertisement in association with the appropriate subject-matter category.

In yet another embodiment, the present invention relates to a computerized system for retrieving advertisements having the same subject matter as visual media objects. The system includes an advertisement receiving component for receiving a plurality of advertisements and one or more keywords associated with each of the advertisements and for storing the advertisements and associated keywords in association with one another. The system also includes an advertisement categorizing component for categorizing the plurality of advertisements into subject-matter categories using the respectively associated keywords. The system further includes, a media receiving component for receiving a plurality of visual media objects and a media categorizing component for categorizing the plurality of visual media objects into the subject-matter categories. Finally, the system includes an advertisement retrieval component for retrieving a categorized advertisement having the same subject-matter category as one or more of the plurality of visual media objects.

Having briefly described an overview of embodiments of the present invention, an exemplary operating environment suitable for use in implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
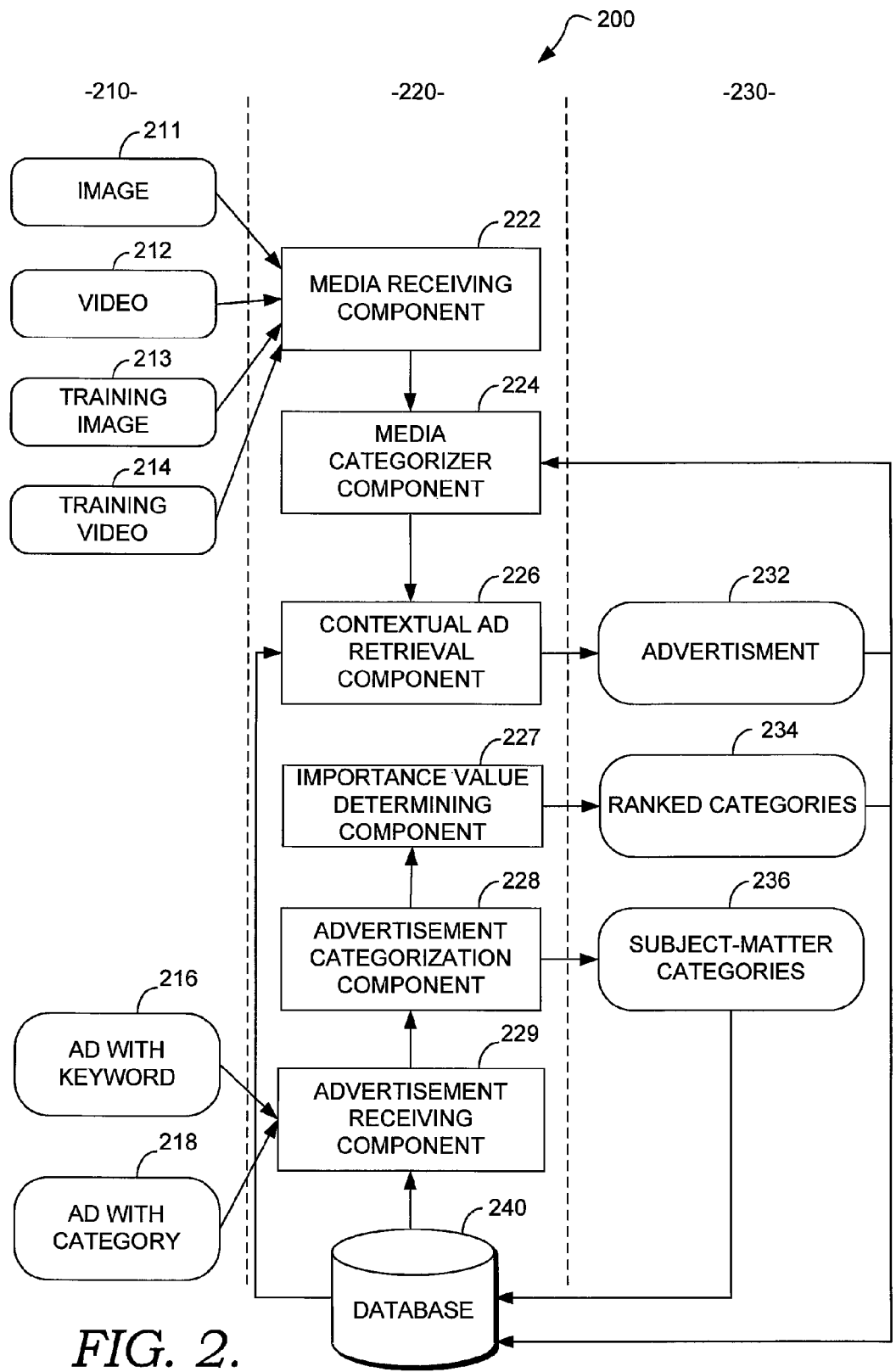
FIG. 2 is a block diagram of an exemplary computing system architecture suitable for use in implementing embodiments of the present invention.

Turning now to FIG. 2, a block diagram is illustrated that shows an exemplary computing system architecture 200 suitable for matching an advertisement with a visual media object, in accordance with an embodiment of the present invention. It will be understood and appreciated by those of ordinary skill in the art that the computing system architecture 200 shown in FIG. 2 is merely an example of one suitable computing system and is not intended to suggest any limitation as to the scope of the use or functionality of the present invention. Neither should the computing system architecture 200 be interpreted as having any dependency or requirement related to any single component/module or combination of component/modules illustrated therein.

Computing system architecture 200 includes system input data 210, a computing environment 220, and output data 230. Computing environment 220 may be a single computing device, such as computing device 100 shown in FIG. 1. In the alternative, computing environment 220 may be a distributed computing environment that includes multiple computing devices coupled with one another via one or more networks. Such networks may include, without limitation, one or more local area networks (LANs) and/or one or more wide area networks (WANs). Such network environments are commonplace in offices, enterprise/wide computer networks, intranets, and the Internet. Accordingly, the network, or combination of networks, is not further described herein.

The system input data 210 shown in FIG. 2 includes an un-categorized image 211, an un-categorized video 212, a training image 213, a training video 214, an advertisement with one or more associated keywords 216, and an advertisement with an associated subject-matter category 218. The system input data 210 may be transferred to the computing environment 220 in a variety of manners. In one embodiment, the system input data 210 are transferred to computing environment 220 through a network, e.g., the Internet. In another embodiment, the system input data 210 are transferred to computing environment 220 through a removable memory, such as a CD, Floppy disk, or Flash drive. In yet another embodiment, the system input data 210 are entered using a keyboard that is communicatively coupled to a computing device within computing environment 220. A user interface may be provided to facilitate the transfer of system input data 210 to a computing device within the computing environment 220. The system input data 210 may be transferred from one program to a component within computing environment 220. In that instance, the program could be within computing environment 220 or on a separate computing device (not shown) that is communicatively coupled to computing environment 220.

As shown in FIG. 2, the computing environment 220 includes a media receiving component 222, a media categorizing component 224, an advertisement retrieving component 226, an importance value determining component 227, an advertisement categorizing component 228, an advertisement receiving component 229, and a database 240. In some embodiments, one or more of the illustrated components, may be implemented as stand-alone applications. In other embodiments, one or more of the illustrated components, may be integrated directly into the operating system of one or more computing devices within computing environment 220.

It will be understood by those of ordinary skill in the art that the components 222, 224, 226, 227, 228, and 229, illustrated in FIG. 2 are exemplary in nature and in number and should not be construed as limiting. Any number of components may be employed to achieve the desired functionality within the scope of embodiments of the present invention. In addition, each component may reside on more than one computing devices within computing environment 220.

The media receiving component 222 is configured for receiving visual media objects. Visual media objects may be in the form of images, video or a combination thereof. In one embodiment, the media receiving component 222 receives one or more training images 213 and/or training videos 214 that are used to train the media categorizing component 224. In another embodiment, the media receiving component 222 receives one or more un-categorized images 211 and/or un-categorized videos 212. When either un-categorized videos 212 or training videos 214 are received, the media receiving component 222 may perform a key frame extraction process that finds key frames that are distinctive and representative of the video subject matter. The key frame extractions are performed as a preparatory step for the media categorizing component 224 that analyzes the key frames rather than every frame in the video. In embodiments, other preparatory steps may also be performed by the media receiving component 222 as needed.

The media categorizing component 224 is configured to categorize un-categorized images 211 or un-categorized videos 212 into subject-matter categories. Before the media categorizer component 224 may be used to classify un-categorized images 211 or un-categorized videos 212, it generally will first be trained using training images 213 and training videos 214. Generally, the training images 213 and training videos 214 are manually pre-classified into subject-matter categories. The media categorizing component 224 may break down the image into various descriptors. Descriptors include sharp edges, soft edges, colors, large blocks of colors, and other such identifying features associated with the image. The media categorizing component 224 may process the visual media object through shape extraction, space partitioning and object recognition algorithms and determine a subject-matter category relevant to the visual media object utilizing one or more of a set of rules and learning algorithms. Using the training images 213 and/or training videos 214, the media categorizing component 224 learns what descriptors are common to the respective subject-matter categories.

Once the media categorizing component 224 is trained, it may then be used to classify un-categorized images 211 or un-categorized videos 212 into subject-matter categories based on the descriptors identified in the un-categorized visual media object. Once in operation, the media categorizing component 224 may be continually improved through additional training methods. Subject-matter categories may be added or removed as desired. The media categorizer component 224 may receive the unclassified images 211 or un-classified videos 212 from the media receiving component 222 which may perform preparatory steps on the videos as described above.

In one embodiment, the media categorizer component 224 is only trained to classify un-categorized images 211 or un-categorized videos 212 into subject-matter categories that have an objective importance, for instance, a sufficient commercial demand, assigned by importance value determining component 227, above a pre-determined threshold value. The operation of the importance value determining component 227 is explained in more detail hereafter. In addition, if a sufficient number of training images 213 or training videos 214 are not available for a particular subject-matter category, then that subject-matter category may be abandoned or combined into a related category. Related subject-matter categories may also be combined if the media categorizer component 224 is unable to reliably distinguish between two similar subject-matter categories.

The advertisement receiving component 229 is configured to receive advertisements with associated keywords 216 or advertisements with associated subject-matter categories 218. The advertisements may be received over an Internet connection or other method. In one embodiment, advertisements are submitted to the advertisement receiving component 229 along with associated keywords and/or categories through a user interface provided by the advertisement receiving component 229. In some embodiments, the advertisement receiving component 229 stores the advertisements along with their associated keywords and categories in a database, for instance, database 240. The advertisement receiving component 229 may also pass the advertisements directly to the advertisement categorizing component 228.

The advertisement categorizing component 228 is configured to categorize advertisements into subject-matter categories using the keywords that are submitted with the respective advertisements. The subject-matter categories may be organized hierarchically. By way of example, and not limitation, the advertisement categorizing component 228 may use classification algorithms such as the support vector machine (SVM), trigram, the Bayesian Algorithm, or other suitable classification algorithm. The advertisement categorizing component 228 may receive the advertisements and keywords directly from the advertisement receiving component 229 or may retrieve the advertisements and keywords from the database 240. The advertisement categorizing component 228 may output the advertisements sorted by subject-matter categories into a list 236 that may then be stored in a table within database 240 or otherwise accessed by users directly, for example through a user interface or print out.

The importance value determining component 227 is configured to determine an importance value for each of the subject-matter categories relative to one another and/or a predetermined threshold value. Such determination may be made, for instance, based upon commercial advertising demand. Commercial advertising demand may be determined by weighing a variety of factors including, but not limited to, the number of advertisers submitting advertisements within a particular subject-matter category assigned thereto, the probability that an advertisement having a particular category assigned thereto will be selected by a viewer, the number of advertisements within a particular subject-matter category, and an objective importance of advertisements having a particular category assigned thereto, such importance being based, for instance, on the amount of money that advertisers are willing to pay to have the advertisements within a subject-matter category presented or a monetization value associated with advertisements having the particular category assigned thereto. The importance value determining component 227 is configured to determine an importance value for each subject-matter category used by the advertisement categorizing component 228. In one embodiment, the importance value reflects the commercial value of the subject-matter category. Thus, a high importance value would be assigned to a subject-matter category that has a lot of advertisers that are willing to pay relatively high amounts of money for there advertisements to be presented. Subject-matter categories with an importance value above a threshold value may be classified as highly important. In one embodiment, visual media objects are categorized only into highly important categories. The importance value determining component 227 may receive the subject-matter categories from advertisement categorization component 228, directly from database 240, or though any other available method within the scope of embodiments hereof. The output from the importance value determining component 227 may be a list ranking the subject-matter categories 234 with respect to one another, a list indicating those subject-matter categories that have an importance value only above and/or below a threshold value, or any combination thereof. The output may be stored in the database 240, or output as a file directly to a user or other application.

The advertisement retrieving component 226 receives the subject-matter classification assigned to the un-categorized visual media object by the media categorizing component 224, and retrieves a categorized advertisement 232 from the same subject-matter category. In one embodiment, the advertisement retrieving component 226 retrieves the categorizedl advertisement from the database 240.

The database 240 is configured to store advertisements along with associated keywords and subject-matter categories. In some embodiments, un-categorized images 211, un-categorized videos 212, training images 213, and training videos 214 are stored in association with the database 240. The database 240 maybe accessed by components 222, 224, 226, 227, 228, and 229 as needed. All system input data 210 and output data 230, as well as intermediary data, maybe stored temporarily or permanently in the database 240. In some embodiments, the database 240 is configured to be searchable for one or more of the items stored in association therewith. It will be understood and appreciated by those of ordinary skill in the art that the information stored in the database 240 may be configurable and may include any information relevant to the advertisements, visual media objects, components 222, 224, 226, 227, 228, and 229, system input data 210 and output data 230. The content and volume of such information are not intended to limit the scope of embodiments of the present invention in any way. Further, though illustrated as a single independent component, the database 240 may, in fact, be a plurality of databases, for instance, a database cluster, portions of which may reside on a plurality of computing devices.

Referring next to FIG. 3, a flow diagram showing an exemplary method for selecting an advertisement is illustrated and designated generally as reference numeral 300. At step 310, a visual media object is received. A visual media object is a media object that communicates its content through a display that may be viewed. Visual media objects may generally be divided into two categories: images and videos. Images contain visual representations that do not change or move when viewed. The image may be in a file type that is capable of display by a web browser. Examples of such file types, include, but are not limited to, a GIF, JPEG, TIF or SVG file formats. A video contains visual representations that change and/or move when viewed. Audio content may also be associated with the visual media object, as with the sound track on a movie or video. The video may be in a file type that is capable of display by a web browser, one example of which is the MPEG format.

At step 320, the visual media object is assigned a subject-matter category using an automated image recognition application. The visual media object is classified into a subject-matter category for which advertisements are available for presentation. Prior to operation, the automated image recognition application is trained to classify un-categorized visual media objects into subject-matter categories using training images 213 and training videos 214 that have been manually assigned a subject-matter category. In one embodiment, the visual media object is assigned to a subject-matter category that has an objective importance value, for instance, a commercial demand rank, above a designated threshold value.

At step 330, an advertisement assigned the same subject-matter category as the visual media object, is retrieved. The advertisement may be retrieved from a database, such as database 240, that contains advertisements that have been assigned subject-matter categories. At step 340, the advertisement is stored in association with the visual media object (or an identifier thereof) for later use. In one embodiment, advertisements are continually received in association with relevant keywords and/or subject-matter categories. If the advertisement is associated with only keywords, the advertisement is then categorized into a subject-matter category using the keywords. The categorization process may be performed automatically using any state of the art classifying algorithm such as SVM (Support Vector Machine), a trigram, or other method. The advertisements should be categorized into subject-matter categories no more specific than can accurately be identified by the image recognition application. As image recognition applications improve, the subject-matter categories may become more specific.

In one embodiment, the subject-matter categories are ranked relative to one another and/or a pre-determined threshold value based on one or more indicators of objective importance, for instance, commercial advertising demand. Commercial advertising demand may be calculated based on a number of factors that include, but are not limited to, the number of advertisements within a subject-matter category, the number of advertisers submitting advertisements with a subject-matter category, the probability of an advertisement having a particular subject-matter category assigned thereto being clicked by a viewer, a frequency with which an advertisement with the subject-matter category assigned thereto will be clicked by a viewer, a frequency with which viewers convert in response to seeing an advertisement with the subject-matter category assigned thereto, and an objective importance of advertisements within a particular category, for instance, determined by the amount of money advertisers are willing to pay to have advertisements within the subject-matter category presented. In one embodiment, the un-categorized visual media object is only classified into categories that have been assigned an importance value (e.g., a commercial demand rank) above a threshold value. The threshold value may be set, for instance, at a point where the expense to set up, and operate embodiments of the present invention, is more than offset by the increase in advertising revenue likely to result from matching advertisements with previously un-categorized visual media objects. As the cost of setting up and operating embodiments of the present invention decreases, more and more subject-matter categories may become commercially viable.

In one embodiment, an un-categorized visual media object on a webpage or within a web server is selected for pre-classification. The un-categorized visual media object is retrieved and assigned a subject-matter category, as in step 320. The subject-matter category assigned to the visual media object may be tracked using a table or other method. The table may be accessed when a visual media object is received to see if the visual media object has already been assigned a subject-matter category. In another embodiment, the visual media object is categorized in real time as it is displayed.

Referring next to FIG. 4, a flow diagram showing an exemplary method for selecting an advertisement in the same context as a visual media object is illustrated and designated generally as reference numeral 400. At step 410, individual advertisements, within a group of advertisements, are categorized by subject matter. In one embodiment, the advertisements have been previously submitted for online advertising. The advertisements are submitted with keywords or categories that are used to define the subject matter of the advertisement. The advertising categorization process may be coordinated with an image categorization process so that the two processes use the same subject-matter categories. The subject-matter categories into which the advertisements are categorized should be no more specific than the image categorization technology is capable of differentiating between. Once advertising categories have been established, a user interface may be provided to allow the advertiser to submit a new advertisement and select a category to associate with the advertisement.

At step 420, an importance value is assigned to each subject-matter category. Assigning an importance value, for instance, based upon a commercial demand rank, to a subject-matter category was explained hereinabove with reference to FIG. 3. At step 430, a visual media object is classified into a first subject-matter category that has an importance value at or above a pre-determined threshold value. Subject-matter categories below the importance value threshold are not used. At step 440, an advertisement from the same subject-matter category into which the visual media object is classified is retrieved. The advertisement may be retrieved from a database, such as database 240. This advertisement is then stored in association with the visual media object (or an identifier thereof) at step 450.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. A method of selecting an advertisement, the method comprising:
    receiving a video;
    extracting key frames from the video through a key frame extraction process, wherein the key frames are distinctive and representative of the video's subject matter;
    identifying one or more descriptors within the key frames, wherein the one or more descriptors comprise sharp edges, colors, and large blocks of color;
    determining a subject-matter category for the video using an image classification algorithm that analyzes the descriptors to determine the subject matter, wherein the image classification algorithm is a machine learning algorithm that uses training videos that are pre-classified into the subject matter to learn what descriptors are common to the subject matter;
    receiving an advertisement and one or more keywords associated with the advertisement;
    classifying the advertisement into the subject-matter category using a support vector machine that analyzes the keywords received with the advertisement;
    generating a first plurality of subject matter categories by analyzing a group of keywords associated with advertisements;
    ranking the subject-matter categories based on commercial advertising demand that reflects the commercial value of the subject-matter categories;
    generating a second plurality of subject-matter categories comprising subject-mater categories in the first plurality of subject-matter categories that have a commercial advertising demand above a threshold value;
    determining that two related subject-matter categories within the second plurality of subject-matter categories are too similar for the image classification algorithm to reliably distinguish between the two related subject-matter categories;
    as a result, combining the two related subject-matter categories in to a new category that encompasses the two related subject-matter categories, thereby causing subject-matter categories within the second plurality of subject-matter categories to be distinguishable and have a commercial advertising demand above the threshold; and
    storing the advertisement.

2. The method of claim 1, wherein the method further comprises:
    receiving the advertisement and the subject-matter category associated with the advertisement.

3. A computerized system for retrieving an advertisement that has the same subject matter as a visual media, the system comprising:
    an advertisement receiving module configured to receive the advertisement and one or more keywords associated with the advertisement, and store the advertisement and one or more keywords in a data store;
    an advertisement categorizing module configured to categorize a group of advertisements into subject-matter categories using a support vector machine that analyzes the keywords received with the advertisement;
    a media receiving module configured to receive a video;
    a media categorizing module configured to categorize the video into the subject-matter categories used by the advertisement categorizing module by extracting key frames from the video through a key frame extraction process, wherein the key frames are distinctive and representative of the video's subject matter, by identifying one or more descriptors within the key frames, wherein the one or more descriptors comprise sharp edges, colors, and large blocks of color, and by using an image classification algorithm that analyzes the descriptors to determine the subject-matter category, wherein the image classification algorithm is a machine learning algorithm that uses training videos that are pre-classified into the subject-matter category to learn what descriptors are common to the subject-matter category, and wherein the image categorizing module is configured to categorize images only into subject-matter categories with a highly commercialized status and that are distinguishable by the image classification algorithm; and
    an advertisement retrieval module configured to retrieve at least one advertisement that is in the same subject-matter category as the video.

4. The computerized system of claim 3 wherein the advertisement receiving module is further configured to receive the advertisement and the subject-matter category into which the advertisement is classified.

5. The computerized system of claim 3, further comprising a subject-matter ranking module configured to:

rank individual categories within the subject-matter categories based on commercial advertising demand that is determined by a probability that an advertisement having a particular category assigned thereto will be selected by a viewer; and assign the individual subject-matter categories above a threshold rank a highly commercialized status.

6. The computerized system of claim 5, wherein the rank is further based on one or more factors including:

an amount of advertisements within the category;

an amount of money an advertiser is willing pay to display the ad; and an amount of advertisers that have submitted advertisements within the category.

7. The computerized system of claim 5, wherein the highly commercialized status of a subject-matter category is reevaluated when the amount of advertisements stored in the data store changes.

8. A method of choosing an advertisement in the same context as a video, the method comprising:

categorizing individual advertisements into subject-matter categories based on keywords associated with each advertisement, wherein the subject-matter categories are only those that are distinguishable by the image classification algorithm;

assigning a commercial demand rank to each subject-matter category;

extracting key frames from the video through a key frame extraction process, wherein the key frames are distinctive and representative of the video's subject matter;

identifying one or more descriptors within the key frames, wherein the one or more descriptors comprise sharp edges, colors, and large blocks of color;

determining a subject-matter category for the video that has a commercial demand rank above a threshold value using an image classification algorithm that analyzes the descriptors to determine the subject-matter category, wherein the image classification algorithm is a machine learning algorithm that uses training videos that are pre-classified into the subject-matter category to learn what descriptors are common to the subject-matter category;

retrieving an advertisement from the subject-matter category; and storing the advertisement.

9. The method of claim 8, wherein the method further comprises:

calculating the commercial viability rank based on factors including one or more of the following:

an amount of advertisements within the category;

a probability of the advertisement being clicked by a viewer;

an amount of money an advertiser is willing pay to display the ad; and an amount of advertisers that have submitted advertisements within the category.

10. The method of claim 9, wherein the method further comprises:

updating the commercial viability rank for each category when data within the factors used to calculate the commercial viability rank changes.

11. The method of claim 8, wherein the method further comprises receiving an advertisement and at least one associated keyword.

12. The method of claim 8, wherein the advertisements that are classified into a first set of subject-mater categories are associated with more than one keyword.

13. The method of claim 1, wherein ranking the subject-matter categories based on commercial advertising demand is based on one or more of the following:

an amount of advertisements within the category;

a probability of the advertisement being clicked by a viewer;

an amount of money an advertiser is willing pay to display the ad; and an amount of advertisers that have submitted advertisements within the category.

14. The method of claim 1, wherein ranking the subject-matter categories based on commercial advertising demand is based on an amount of advertisements within the category.

15. The method of claim 1, wherein ranking the subject-matter categories based on commercial advertising demand is based on an amount of advertisers that have submitted advertisements within the category.

* * * * *